United States Patent
Buglass et al.

(10) Patent No.: US 7,687,166 B2
(45) Date of Patent: Mar. 30, 2010

(54) PROCESS FOR GENERATION OF ELECTRICITY FROM A SOLID OXIDE FUEL CELL AUXILIARY POWER UNIT USING ENGINE EXHAUST GAS

(75) Inventors: John Graham Buglass, Amsterdam (NL); Marinus Franciscus Goes, Amsterdam (NL); Ronald Jan Schoonebeek, Amsterdam (NL)

(73) Assignee: Shell Oil Company, Houston, TX (US)

( * ) Notice: Subject to any disclaimer, the term of this patent is extended or adjusted under 35 U.S.C. 154(b) by 823 days.

(21) Appl. No.: 10/573,271

(22) PCT Filed: Sep. 24, 2004

(86) PCT No.: PCT/EP2004/052306

§ 371 (c)(1), (2), (4) Date: Mar. 23, 2006

(87) PCT Pub. No.: WO2005/029629

PCT Pub. Date: Mar. 31, 2005

(65) Prior Publication Data

US 2007/0037024 A1 Feb. 15, 2007

(30) Foreign Application Priority Data

Sep. 25, 2003 (EP) .................................. 03256030

(51) Int. Cl.
*H01M 8/04* (2006.01)
*H01M 8/06* (2006.01)

(52) U.S. Cl. .......................................... 429/17; 429/12

(58) Field of Classification Search .................. 429/17, 429/12
See application file for complete search history.

(56) References Cited

U.S. PATENT DOCUMENTS

| 4,593,141 A | 6/1986 | Oswald et al. ............... 568/454 |
| 5,686,196 A | 11/1997 | Singh et al. ................... 429/17 |
| 5,968,680 A | 10/1999 | Wolfe et al. ................... 429/13 |
| 6,562,496 B2 | 5/2003 | Faville et al. ................. 429/13 |

(Continued)

FOREIGN PATENT DOCUMENTS

EP 1030395 8/2000

(Continued)

OTHER PUBLICATIONS

Peter Holtappels and Al: "Simulation of gasoline and diesel fuelled various sized SOFC power generations systems for mobile applications", Proceedings of Fuel Cell World, Jul. 1-5, 2002, pp. 328-335.

*Primary Examiner*—Tracy Dove

(57) ABSTRACT

The invention provides an auxiliary power unit (APU) and process for electricity generation in combination with an internal combustion engine in which the APU includes a solid oxide fuel cell (SOFC) having an inlet for fuel, an inlet for air and/or engine exhaust gas, and an outlet for off-gas; and a catalytic partial oxidation reformer (CPOx) having an outlet which is connected to the inlet for fuel of the SOFC and an inlet for reactants, wherein the inlet for reactants is connected to an outlet for engine exhaust gas of the internal combustion engine through an evaporator having an inlet for fuel and an inlet for engine exhaust gas and an outlet which is connected to the inlet of the CPOx.

9 Claims, 1 Drawing Sheet

U.S. PATENT DOCUMENTS

| | | | |
|---|---|---|---|
| 6,655,325 B1 * | 12/2003 | Botti et al. | 123/3 |
| 6,994,930 B1 * | 2/2006 | Geisbrecht et al. | 429/19 |
| 7,235,322 B2 * | 6/2007 | Akikusa et al. | 429/32 |
| 2003/0008183 A1 | 1/2003 | Hsu | 429/13 |

FOREIGN PATENT DOCUMENTS

| | | |
|---|---|---|
| EP | 1047144 | 10/2000 |
| EP | 1484103 | 12/2004 |

* cited by examiner

PROCESS FOR GENERATION OF ELECTRICITY FROM A SOLID OXIDE FUEL CELL AUXILIARY POWER UNIT USING ENGINE EXHAUST GAS

FIELD OF THE INVENTION

The present invention relates to an auxiliary power unit (APU) for electricity generation in combination with an internal combustion engine and to a process for the generation of electricity using such APU.

BACKGROUND

Solid oxide fuel cell (SOFC) technology has been developed for application in transportation industry, primarily as an on-board auxiliary power unit (APU). Among others, the SOFC-based APU technology provides electric power for passenger cars, for instance for airco systems, lighting, electrically operating windows, breaking and steering systems, and the like.

SOFC-based APU systems can make use of a reformer system for fuelling the system once started. The reformer of choice up to now is a partial oxidation reformer (CPOx) that uses fuel and air, and catalytically converts it to primarily hydrogen, carbon monoxide, and nitrogen. It is housed inside the hot box and operates at high temperature. Such reformers are, for instance, disclosed in U.S. Pat. No. 5,968,680 and U.S. Pat. No. 6,562,496. The reformers according to the prior art are fed fuel and air through valves located in the main plenum chamber. The fuel is introduced through the insulated wall by way of an injector. The output from the CPOx mainly consisting of a carbon monoxide and hydrogen mixture is fed to the SOFC stack directly. This system has a few disadvantages, particularly the necessity to use heat exchangers, pre-heaters, and air blowers. These elements make the fuel system complicated and expensive. Further, according to U.S. Pat. No. 5,968,680 and U.S. Pat. No. 6,562,496 the CPOx mixes hydrocarboneous fuel with heated air to combust or oxidize the mixture. Such a reformer allows a single fuel delivery to the SOFC, but develops very high temperatures in the reformer, leading to accelerated catalyst degradation and coke deposition.

For that reason there is a need for a method for using such units, which is devoid of these disadvantages.

It has now been found that these problems can be solved when the exhaust gas of an internal combustion engine is used to replace at least part of the oxygen to be fed to the partial oxidation reformer.

SUMMARY OF THE INVENTION

The invention relates to an auxiliary power unit (APU) for electricity generation in combination with an internal combustion engine having an outlet for engine exhaust gas, the APU comprising 1) a solid oxide fuel cell (SOFC) comprising an inlet for fuel, an inlet for air and/or engine exhaust gas, and an outlet for off-gas, and 2) a catalytic partial oxidation reformer (CPOx) having an outlet which is connected to the inlet for fuel of the SOFC and an inlet for reactants, wherein the inlet for reactants is connected to the outlet for engine exhaust gas of the internal combustion engine through an evaporator having an inlet for fuel and an inlet for engine exhaust gas and an outlet which is connected to the inlet of the CPOx.

Figure 1:
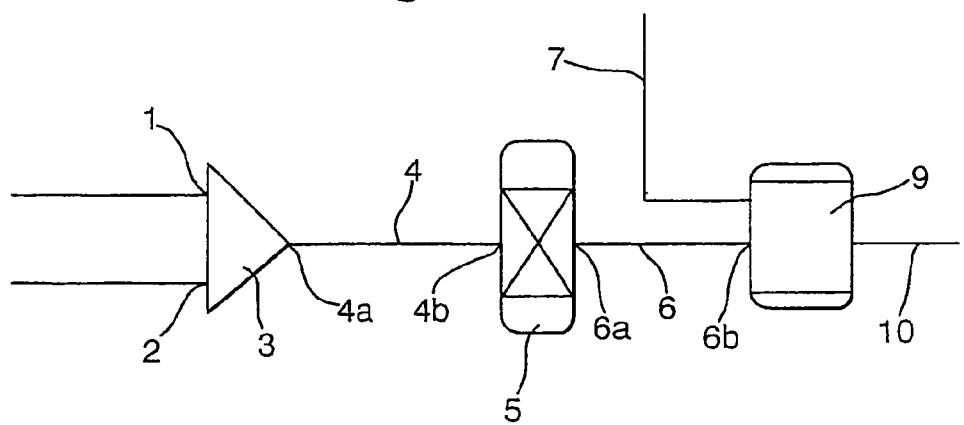
FIG. 1 is a block diagram of an auxiliary power unit according to the present invention.

The advantages of this invention are inter alia that no heat exchangers are required because the heat is already available in the engine exhaust gas, whereas the overpressure of the engine exhaust gas makes the use of blowers, which lead to electric loss, redundant. The present method has more advantages over the prior art, for instance water is already present in the engine exhaust gas, making water recycling and evaporation superfluous. Further, high adiabatic temperatures are avoided, less coke formation and thermal shock occur in the SOFC leading to increased catalytic lifetimes, and moreover, start-up of the unit is simple when the engine exhaust gas has pre-heated the CPOx and SOFC to start-up temperature, whereas fuel consumption is held at a minimum.

The CPOx reactor into which the fuel, engine exhaust gas, and optionally an oxygen-containing gas (the feed) are routed includes a reactor or exterior wall, which may be of a cylindrical shape. The exterior wall may be constructed of metal, quartz or other materials, which can withstand temperatures up to about 1300° C. and are substantially chemically inert to hydrocarbon oxidation or carbon formation. Suitable materials can include quartz-lined steel, high temperature ceramics, ceramic metal composites, nickel based superalloys, cobalt based superalloys, and in general, high temperature metals and metals protected by ceramic coatings. Within the exterior wall radiation shields to contain heat within a catalytic reaction zone, as well as to allow the feed to pass through the reactor, may be present. The shields may be configured in the shape of cylindrical plugs and made of a high temperature ceramic with an appreciable void volume (i.e., porosity). The shields can be made of materials such as zirconia, alumina, and cermets. The shields may be upstream and downstream of the reactor, but may also usefully be placed so as to surround or encase the reactor.

The shields define the area of a catalytic reaction zone where the partial oxidation reaction occurs. Further provided by the shields is a means for maintaining a catalytic reaction temperature within the catalytic reaction zone. Unless the reaction zone is at a particular reaction temperature, the partial oxidation reaction cannot be initiated. Therefore, the reaction temperature within the reaction zone may initially be provided by hot engine exhaust gas.

However, a particular reaction temperature may have deleterious effects on CPOx processing, such as sulfur formation on the catalyst, incomplete oxidation, and by-product formation. To achieve the desired effects of the reaction temperature while seeking to avoid the deleterious effects, the reaction temperature is usefully maintained in the present invention at a temperature in the range of from about 600° C. to 1200° C.

Within the reaction zone is disposed the catalyst which serves to catalyze the step or act of partially oxidizing the feed. Although the catalyst can vary, the preferred embodiment of the present invention contemplates that the catalyst comprises a noble metal supported on a porous ceramic or metal monolith, preferably a ceramic foam. Preferred ceramic materials comprise zirconia. Thereby, the feed enters the reaction zone where it is contacted with the catalyst, with the contact being controlled by regulating the catalytic contact time. In large part, the contact time is controlled by the feed flow rate and configuration of the catalyst.

It is beneficial to maintain a liquid hourly space velocity (LHSV) of greater than about 0.5 $h^{-1}$, and preferably in the range of about 0.5 $h^{-1}$ to 75 $h^{-1}$. LHSV is defined as the liquid hydrocarbon flow rate per unit volume of catalyst, with the catalyst volume defined as the volume occupied by the monolith. A more tortuous flow path created by the catalyst increases the contact time. The duration of the contact time is controlled in order to maximize partial oxidation and minimize further oxidation of hydrogen and carbon monoxide. A useful contact time is not more than about 500 milliseconds. A preferred range of contact time is from about 10 to 500 milliseconds. More preferably, the contact time is about 50 to 200 milliseconds and, in particular, about 100 milliseconds.

As a result of the reaction parameters described above, the partial oxidation in the reaction zone produces synthesis gas that can exit the CPOx reactor. The synthesis gas substantially comprises hydrogen gas, carbon monoxide, carbon dioxide, water vapor, hydrogen sulfide, methane, traces of unconverted hydrocarbons, traces of other sulfur compounds, and nitrogen.

The hot synthesis gas is discharged into the solid oxide fuel cell via its inlet for fuel. Via its inlet for air and/or engine exhaust gas, engine exhaust gas may be introduced in the SOFC. The SOFC is a fuel cell which is known in the art and which comprises a plurality of elements, each element comprising an anode layer and a cathode layer, separated from each other by means of a solid electrolyte layer. Charge transfer through the solid electrolyte layer from the cathode to the anode is done by oxygen ions.

The overall cathode reaction of a solid oxide fuel cell is:

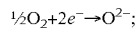
$$\tfrac{1}{2}O_2 + 2e^- \rightarrow O^{2-};$$

and the overall anode reaction is:

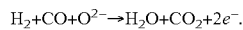
$$H_2 + CO + O^{2-} \rightarrow H_2O + CO_2 + 2e^-.$$

The anode off-gas thus comprises carbon dioxide and water.

The elements of SOFC systems are known to the skilled person and are, for instance, either flat plates or tubes to form a planar or tubular solid oxide fuel cell, respectively. A commonly used anode material comprises Ni and yttria-stabilised zirconia. The cathode layer is a porous layer of an electron-conductive ceramic material, typically a mixed metal oxide having a perovskite structure. Lanthanum-strontium-manganese oxides are a commonly used cathode material. The solid electrolyte layer of a solid oxide fuel cell is oxygen-ion conductive and has very limited conductivity for electrons. This layer is dense and impermeable to gases. Yttria-stabilised zirconia is commonly used.

In fuel cells, all elements, i.e. the tubes or plates, are electrically connected to each other.

During normal operation of the APU according to the invention, synthesis gas is fed via the inlet for fuel to the anode side of the elements. An oxygen-containing gas and/or engine exhaust gas is fed via the inlet for air and/or engine exhaust gas to the cathode side of the elements. In a preferred embodiment an oxygen-containing gas, preferably air, is premixed with engine exhaust gas and the resulting mixture is fed via the inlet for air and/or engine exhaust gas to the cathode side of each element. The cathode and anode reactions take place resulting in the generation of electricity and the production of anode off-gas comprising carbon oxides, water and hydrogen at the anode side of the elements. Depleted air is formed at the cathode side of the elements.

Preferred hydrocarbonaceous fuels comprise diesel, gasoline and special fuel cell grade fuel.

Accordingly, the invention further relates to a process for the generation of electricity from a hydrocarbonaceous fuel, wherein, in the auxiliary power unit as herein-above described:

a) both hydrocarbonaceous fuel and engine exhaust gas are introduced into the evaporator;

b) after which the evaporated or partly evaporated mixture of fuel and engine exhaust gas is introduced into the CPOx and converted into synthesis gas; and c) the synthesis gas is introduced into the SOFC via the inlet for fuel and an oxygen-containing gas and/or engine exhaust gas is introduced into the SOFC via the inlet for air and/or engine exhaust gas to generate electricity.

In a preferred process the synthesis gas is introduced into the SOFC via the inlet for fuel and engine exhaust gas is introduced into the SOFC via the inlet for air and/or exhaust gas. In another preferred embodiment of the invention, engine exhaust gas is introduced into the evaporator as a mixture with an oxygen-containing gas, such as air.

The APU and the process according to the invention will be illustrated by means of the following FIGURE.

FIG. 1 shows a block diagram of an auxiliary power unit (APU) for electricity generation that is operated in combination with an internal combustion engine, the APU comprising a solid oxide fuel cell 9 comprising an conduit 6 for fuel, a conduit for air and/or engine exhaust gas 7, a conduit for off-gas 10, a catalytic partial oxidation reformer 5 having an outlet 6a which is connected via conduit 6 to the inlet 6b of the SOFC 9 and an inlet 4b for reactants. The reactants comprise hydrocarbonaceous fuel and as oxygen source at least engine exhaust gas, which are transported to the inlet of the CPOx 5 through an evaporator 3 having an inlet for fuel 1 and an inlet for engine exhaust gas 2 and an outlet 4a which is connected via conduit 4 to the inlet 4a of the CPOx 5.

The invention claimed is:

1. A process for generation of electricity from a hydrocarbonaceous fuel, in an auxiliary power unit for electricity generation in combination with an internal combustion engine having an outlet for engine exhaust gas, said process comprising:
   introducing both hydrocarbonaceous fuel and engine exhaust gas into an evaporator to form a mixture wherein at least part of the fuel is evaporated;
   introducing the mixture of fuel and engine exhaust gas into a catalytic partial oxidation reformer to form a synthesis gas; and
   introducing the synthesis gas into a solid oxide fuel cell via an inlet for fuel and an oxygen-containing gas into the solid oxide fuel cell via an inlet for an oxygen containing gas to generate electricity.

2. A process for the generation of electricity from a hydrocarbonaceous fuel as defined in claim 1 wherein the oxygen-containing gas comprises engine exhaust gas.

3. A process for the generation of electricity from a hydrocarbonaceous fuel as defined in claim 2 wherein the oxygen-containing gas further comprises air.

4. A process for the generation of electricity from a hydrocarbonaceous fuel as defined in claim 1 wherein the engine exhaust gas in introduced into the evaporator as a mixture with air.

5. A process for the generation of electricity from a hydrocarbonaceous fuel as defined in claim 2 wherein the engine exhaust gas in introduced into the evaporator as a mixture with air.

6. A process for the generation of electricity from a hydrocarbonaceous fuel as defined in claim 1 wherein the hydrocarbonaceous fuel comprises diesel.

7. A process for the generation of electricity from a hydro carbonaceous fuel as defined in claim 2 wherein the hydrocarbonaceous fuel comprises diesel.

8. A process for the generation of electricity from a hydrocarbonaceous fuel as defined in claim 1 wherein the hydrocarbonaceous fuel comprises gasoline.

9. A process for the generation of electricity from a hydrocarbonaceous fuel as defined in claim 2 wherein the hydrocarbonaceous fuel comprises gasoline.

\* \* \* \* \*